United States Patent
Fredinburg et al.

(10) Patent No.: US 9,549,047 B1
(45) Date of Patent: Jan. 17, 2017

(54) INITIATING A CLIENT-SIDE USER MODEL

(71) Applicant: Google Inc., Mountain View, CA (US)

(72) Inventors: Dan Fredinburg, San Francisco, CA (US); Andrew Cary Swerdlow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 13/830,612

(22) Filed: Mar. 14, 2013

(51) Int. Cl.
*H04L 29/06* (2006.01)
(52) U.S. Cl.
CPC .................................. *H04L 67/42* (2013.01)
(58) Field of Classification Search
CPC ............... G06F 17/30867; G06F 17/30914
USPC ........................................................ 709/203
See application file for complete search history.

(56) References Cited

U.S. PATENT DOCUMENTS

| | | | | |
|---|---|---|---|---|
| 5,978,566 | A * | 11/1999 | Plank ..................... | H04L 29/06 709/203 |
| 6,760,758 | B1 * | 7/2004 | Lund et al. .................. | 709/217 |
| 7,197,566 | B1 * | 3/2007 | Kuzma ........................ | 709/227 |
| 8,302,169 | B1 * | 10/2012 | Presotto ................ | G06F 21/602 713/155 |
| 2002/0024536 | A1 * | 2/2002 | Kahan et al. ................. | 345/745 |
| 2002/0073165 | A1 * | 6/2002 | McNulty et al. ............. | 709/217 |
| 2002/0133540 | A1 * | 9/2002 | Sears et al. .................... | 709/203 |
| 2002/0156842 | A1 * | 10/2002 | Signes et al. ................. | 709/203 |
| 2002/0184338 | A1 * | 12/2002 | Haines et al. ................. | 709/218 |
| 2003/0074660 | A1 * | 4/2003 | McCormack et al. ............ | 725/2 |
| 2003/0135853 | A1 * | 7/2003 | Goldman et al. ............... | 725/34 |
| 2003/0177196 | A1 * | 9/2003 | Bhasin ............. | G06F 17/30902 709/213 |
| 2008/0172357 | A1 * | 7/2008 | Rechis ................ | G06F 17/3087 |
| 2010/0250558 | A1 * | 9/2010 | Wang ..................... | G06Q 30/02 707/749 |
| 2010/0325313 | A1 * | 12/2010 | Esteve Asensio .... | G06F 9/4451 709/246 |
| 2012/0016902 | A1 * | 1/2012 | Ranjan .................... | H04W 4/02 707/769 |
| 2012/0192221 | A1 * | 7/2012 | McDonough et al. ......... | 725/31 |
| 2013/0191905 | A1 * | 7/2013 | Harada et al. .................... | 726/9 |
| 2014/0257999 | A1 * | 9/2014 | Garcia-Martinez ........ | 705/14.71 |

* cited by examiner

*Primary Examiner* — Ario Etienne
*Assistant Examiner* — Elizabeth Kassa
(74) *Attorney, Agent, or Firm* — McDermott Will & Emery LLP

(57) ABSTRACT

Various aspects of the subject technology relate to systems, methods, and machine-readable media for initiating a client-side user model. A system is configured to receive instructions to initiate a client-side user model for a user, wherein the instructions include a device identifier and a user identifier, identify, based on the user identifier, a user model for the user, wherein the user model is stored on a data server and comprises information about the user, transmit the information about the user in the user model on the data server to a client device corresponding to the device identifier, and delete the user model on the data server.

19 Claims, 9 Drawing Sheets

User Model

User ID:
Name(s):
Age:
Gender:
Location(s):
Self-identifying information:
SSN:
Education:
. . .

Interests:
Preferences
    Color:
    Text size:
    Reading level/style:
    . . .
Current Status
    Health:
Relationships
    Status:
    Friends:
    Family:
    Co-Workers:
    Others:

User Model Manager

User Model — 705

User ID: 29DX817CJ3
Name(s): Jen Lee
Age: 28
Gender: Female
Location(s): San Jose (CA)
Self-identifying information:
SSN: 555-55-1234
...

Interests:
  Baseball
    - Team: SJ-Warriors
  Basketball
  ...

Preferences
  Color: Blue
  Text size: Medium
  Reading level/style: adva
  ...

Current Status
  Health:
  Relationships

Interface Viewer — 710

Select one of your favorite web pages below to see the changes

[news.com] [sports.com] [myschool.edu] [deals.shopping.com] [More ▼]

Or input your own: [_____]

Sports.com — 715

The latest sporting news and scores

Top Headlines

- Spring Training Begins Tuesday
- Interview with Warriors GM about upcoming season
- Giants beat Hawks in a blowout
- R. Johnson scores 24 points and 12 rebounds but misses game winner in loss
- U.S. soccer wins again
...

Top Scores

Basketball
Giants 112
Hawks 78
Wildcats 98
Rangers 103

Football
Bombers 27
Halos 13
...

[Save Changes] — 720

INITIATING A CLIENT-SIDE USER MODEL

BACKGROUND

User information stored on a server is often used to provide users with personalized services. Personalized services may include for example, customized user interfaces (e.g., web pages or application user interfaces), personalized content (e.g., advertisements, offers, suggested items, or other digital content), customized game play or personalized application execution, or any other service that may be personalized based on information related to a user. However, users may feel uncomfortable with some of the user information stored on the server or with the amount of user information stored by the server.

SUMMARY

Various aspects of the subject technology relate to a system for initiating a client-side user model. The system may include one or more processors and a machine-readable medium comprising instructions stored therein, which when executed by the one or more processors, cause the one or more processors to perform operations. The operations may include receiving instructions to initiate a client-side user model for a user, wherein the instructions include a device identifier and a user identifier, identifying, based on the user identifier, a user model for the user, wherein the user model comprises information about the user, transmitting the information about the user in the user model to a client device corresponding to the device identifier, and deleting the user model.

Other aspects of the subject technology relate to a method for initiating a client-side user model. The method may include receiving instructions to initiate a client-side user model for a user, wherein the instructions include a device identifier and a user identifier, identifying, based on the user identifier, a user model for the user, wherein the user model is stored on a data server and comprises information about the user, transmitting the information about the user in the user model on the data server to a client device corresponding to the device identifier, and deleting the user model on the data server.

Various aspects of the subject technology relate to a non-transitory machine-readable medium comprising instructions stored therein, which when executed by a machine, cause the machine to perform operations for initiating a client-side user model. The operations may include receiving instructions to initiate a client-side user model for a user, wherein the instructions include a device identifier and a user identifier, identifying, based on the user identifier, a user model for the user, wherein the user model is stored on a data server and comprises information about the user, transmitting the information about the user in the user model on the data server to a client device corresponding to the device identifier, deleting the user model on the data server, and storing, on the data server, an indication that the user model for the user has been transmitted to the client device corresponding to the device identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIG. 2 is an illustration representing an example user model, in accordance with various aspects of the subject technology.

FIG. 7 is an illustration of an example user interface that provides a user with control over a user model stored on a client device, in accordance with various aspects of the subject technology.

DETAILED DESCRIPTION

Figure 1:
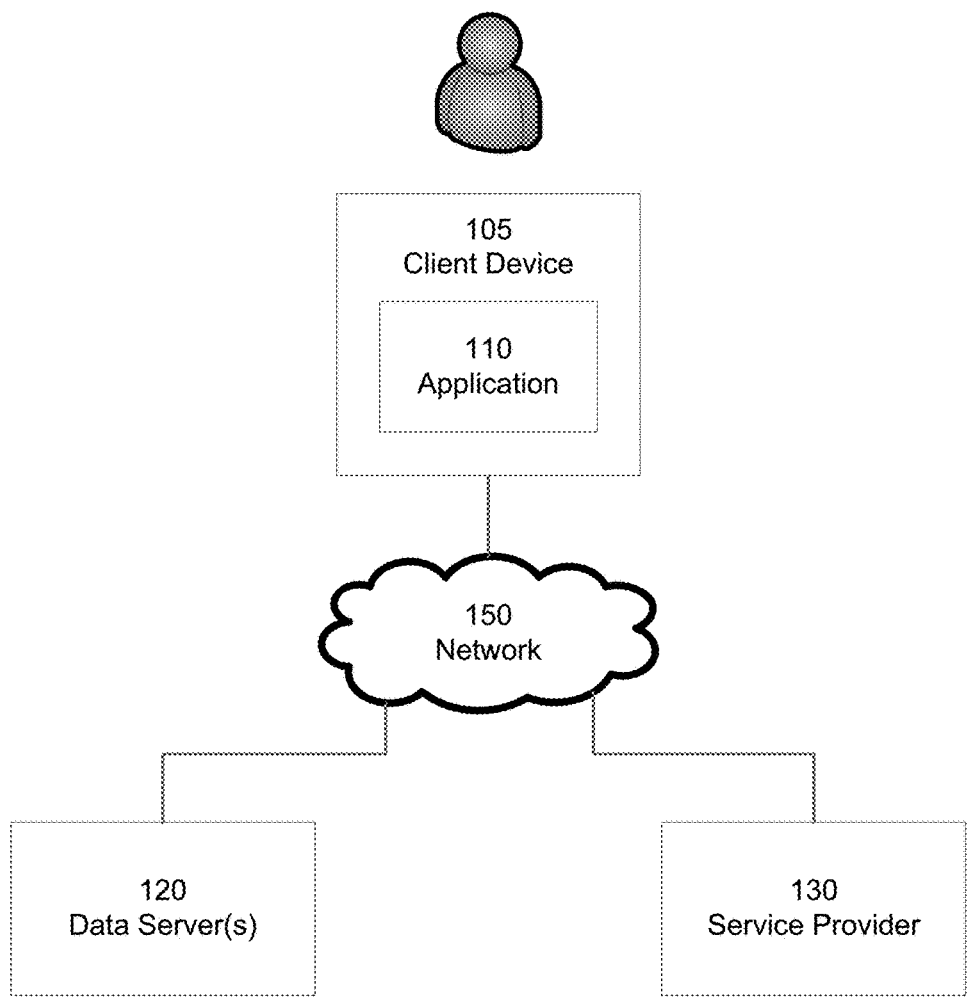
FIG. 1 is a block diagram illustrating an example network environment in which a user model stored on a client device may be used to provide personalized services, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Personalized services often involve the use of user information for a specific user so that the services can be personalized to a specific user. The user information may be collected from a number of sources and stored on one or more servers that the machines providing the personalized service have access to. However, some users may be sensitive about particular pieces of user information being stored by those servers or the aggregate amount of user information stored on those servers. On the other hand, the quality or performance of these personalized services may be improved by having access to more user information. In some cases, personalized services may require additional user information that a user would be unwilling to provide to outside services. Storing the user information on a server may also pose various risks to the user. For example, a service provider may use the information for activities the user has not explicitly authorized or may sell the user information to third parties. The servers that the user information are stored on may also be a target for malicious parties wanting to gain access to user information for a number of users.

Various aspects of the subject technology relate to providing personalized services using a user model stored on a client device. A user model may include a data structure or other unit of data configured to store information about a user that can be used to provide personalized services for the user. Users may feel more comfortable with storing user information in a user model on the client device, where the user may have more control, than storing the user information on one or more data servers. Furthermore, because the user model is stored on the client device, the user may be more comfortable with the user model containing more information about the user, including possibly sensitive user information. Accordingly, personalized services may be improved by being able to personalize their services using more user information. Storing the user model on the client device also protects user information from being compromised by malicious parties targeting the data servers. Furthermore, personalized services using a client-side user model may, in some cases, be more efficient (e.g., the speed of performing the services may be increased and/or the amount of computing resources used may be reduced) because the user information is at the client device. In some aspects, the client device does not need to request some or any user information from a data server. Accordingly providing the personalized services may be performed faster, without waiting for a transmission of a request for user information or waiting for a reply from the data server.

FIG. 1 is a block diagram illustrating an example network environment 100 in which a user model stored on a client device may be used to provide personalized services, in accordance with various aspects of the subject technology. The network environment includes at least one client device 105, one or more computing systems for a service provider 130, and one or more data servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client device 105 can be any machine able to communicate with the service provider 130 via the network 150. The client device 105 may be, for example, a desktop computer, a laptop, a mobile device (e.g., a smart phone, a tablet, a personal digital assistant (PDA), a smart display, a navigation device, etc.), or any other machine with a processor, memory, and communications capabilities. The client device 105 may also include an application 110, such as a web browser or a dedicated program (e.g., an "app" for a mobile device), that is configured to enable a user of the client device 105 to receive personalized services provided by the service provider 130 or interact with the service provider 130. For example, the application 110 may be a web browser configured to display personalized content (e.g., advertisements, links, images, articles, offers, suggested items, offers, search results, or other digital content) based on user information. In another application, the application may be a game or other application configured to provide a customized user experience based on user information.

The service provider 130 may be implemented using systems or devices having a processor, a memory, and communications capability that are configured, as described above, to provide a user with personalized services. For example, the service provider 130 may provide a user with customized user interfaces, personalized content, customized game play, personalized application execution, or any other service that may be personalized based on information related to a user. Although some aspects of the subject technology described below may be discussed with respect to specific personalized services (e.g., providing personalized advertisements in a web page), other personalized services may similarly be provided.

In order to provide the personalized services, however, the service provider 130 may require access to user information. The user information may be stored on one or more data servers 120, on the service provider 130, or on the client device 105 depending on whether or not a client-side user model has been established. Furthermore, some user information may be stored at one location, while other user information may be stored at a different location.

According to some aspects of the subject technology, initially, a user's information may be stored in a user model that resides on one or more of the data servers 120 and may be used to provide personalized services for the user. FIG. 2 is an illustration representing an example user model 200, in accordance with various aspects of the subject technology. The user model 200 may include various information about a user. For example, the user model 200 may include one or more user identifiers such as user IDs, user names, or even a social security number (SSN) for the user. The user model 200 may also include user demographic information such as the user's age, gender, education information (e.g., education level, degrees, schools attended, etc.), or one or more locations associated with the user (e.g., the user's home, the user's places of work, places the user frequents, etc.).

The user model 120 may also include additional information such as one or more interests of the user, one or more preferences, such as preferences in the appearance of user interfaces (e.g., color, text size, reading style or reading level, etc.), the current status of the user's health (e.g., whether the user is sick or what illnesses the user is afflicted with), or a history of user status (e.g., information about previous illnesses or health history). The user model 200 may also include information about a user's relationships such as whether the user is single or in a romantic relationship, the nature of the romantic relationship, if any (e.g., married, dating, etc.), family members or other individuals related to the user, friends of the user, co-workers of the user, or any other individuals with a relationship with the user. In some cases, the user model 200 may also include the user's social security number or other self-identifying information.

Users may have concerns over what kinds of information are stored in the user model 200, the amount of user information stored in the user model, where the user model is stored 200, and what user information is used to personalize services for the user. Accordingly, various aspects of the subject technology relate to providing the user with greater knowledge of and control over what information is in the user model 200, where the information is stored, and how the information is used.

The user model 200 may be generated over one or more interactions with the user. For example, each time a service provider, such as service provider 130 in FIG. 1, interacts with the user and learns a piece of information about the user, the service provider may store the piece of information in the user model 200. In one scenario where the service provider 130 is a search engine, the service provider 130 may receive search requests including search terms from a user on a client device 105. The service provider 130 may provide search results generated based on the search terms to the user on the client device 105 where the user may select one or more of the search results. According to some aspects, the search terms used by the user and/or the search results selected by the user may be stored in the user model 200 by the service provider 130. In other aspects, the search terms and/or the search results selected by the user may be used by the service provider 130 to determine additional pieces of information about the user such as user interests, user health statuses, etc. The additional pieces of information may then be stored in the user model 200.

Instead of storing the user model 200 on a data server 120, however, a user may prefer to store the user model 200 locally on a client device 105. Accordingly, various aspects of the subject technology relate to initiating a client-side user model scheme. Initiating the client-side user model scheme may include transferring the user model 200 from the data server 120 to a client device 105 for storage on the client device 105, deleting the information in the user model 200 on the data server 120, and storing on the data server 120 an indication that the user has implemented the client-side user model scheme. For subsequent requests for user information stored in the user model are received from a service provider 130, the indication on the data server 120 that the user has implemented the client-side user model scheme may cause the service provider 130 to redirect the request for user information to the user's client device 105. In example aspects, initiating the client-side user model scheme may also include determining whether a user model 200 for the user exists on the data server 120. If no user model exists on the data server 120, a new user model 200 may be created on the client device 105 without having to transfer the user model 200 from the data server 120 to the client device 105 and deleting the user model 200 from the data server 120.

By enabling data servers 120 to store user models 200 for users and allowing users to initiate client-side user model schemes on a per user basis, users are provided with a choice of whether to have the user's user model 200 stored on a data server 120 or on the user's client device 105. Furthermore, some users may have their user models 200 stored on one or more data servers 120 while other users may have their user models 200 stored on their respective client devices 105.

Figure 3:
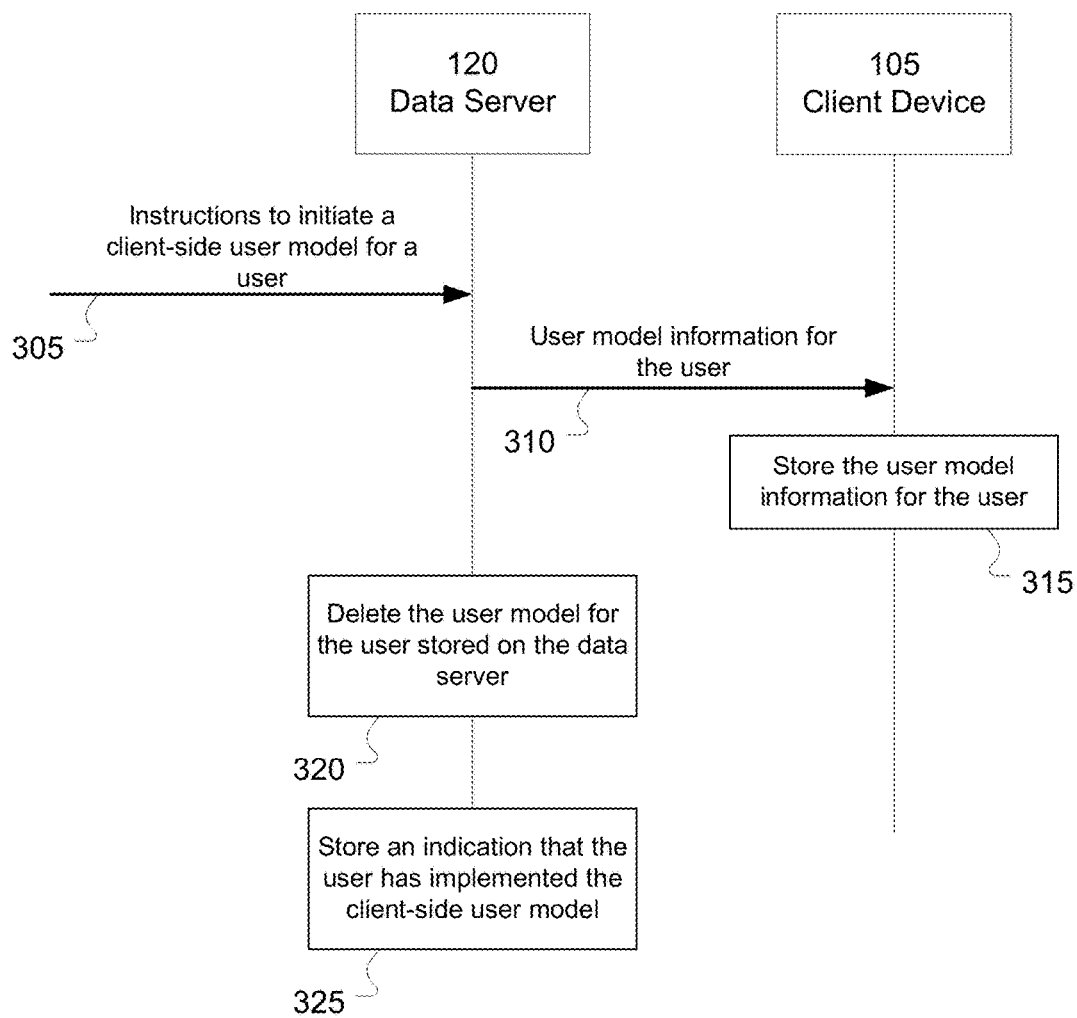
FIG. 3 is a flow chart illustrating an example process for initiating a client-side user model scheme, in accordance with various aspects of the subject technology.

FIG. 3 is a flow chart illustrating an example process 300 for initiating a client-side user model scheme, in accordance with various aspects of the subject technology. Although the operations in process 300 are shown in a particular order, certain operations may be executed in different orders or at the same time. A user wishing to store the user's user model on the user's client device 105 instead of a data server 120 may cause instructions to initiate a client-side user model to be transmitted to the data server 120 at operation 305. The instructions may be transmitted over the network 150 and be sent from an application 110 on the user's client device 105 or via a third-party such as the service provider 130.

In response to receiving the instructions to initiate a client-side user model for the user, the data server 120 can determine whether there is a user model associated with the user stored on the data server 120. If there is a user model for the user on the data server, the data server 120 can transmit the user model information to the user's client device 105 at operation 310 where it can be stored at operation 315. In some aspects, the entire user model (e.g., user model 200 in FIG. 2) may be transmitted to the client device 105. In other aspects, however, only some or all of the information in the user model may be transmitted to the client device 105.

After the user model information has been transmitted to the client device 105, the data server 120 can also delete the user model on the data server 120 at operation 320 so that the user information in the user model is no longer stored on the data server 120. In some implementations, service providers 130 may be configured to request user information from the client device 105 that the user model is located on. However, in other cases, one or more service providers 130 may be configured to direct requests for user information to the data server 120. Accordingly, according to some aspects of the subject technology, at operation 325, the data server 120 can store an indication that the user has implemented a client-side user model.

The indication may be, for example, a flag, a stub, a placeholder (e.g., a null or empty user model or a user model set to a particular value), or any other data that indicates that the user model containing information for the user that can be used to provided personalized services is not stored on the data server 120. As will be discussed in more detail further below, when a service provider 130 requests user information from the data server 120, the data server 120 may inform the service provider 130 that the user information is not stored on the data server 120. According to some aspects, the indication may further contain a reference to the user model stored on the client device 105, thereby providing the service provider 130 of the location of the user model so that the service provider 130 may request the user information from the client device.

Figure 4:
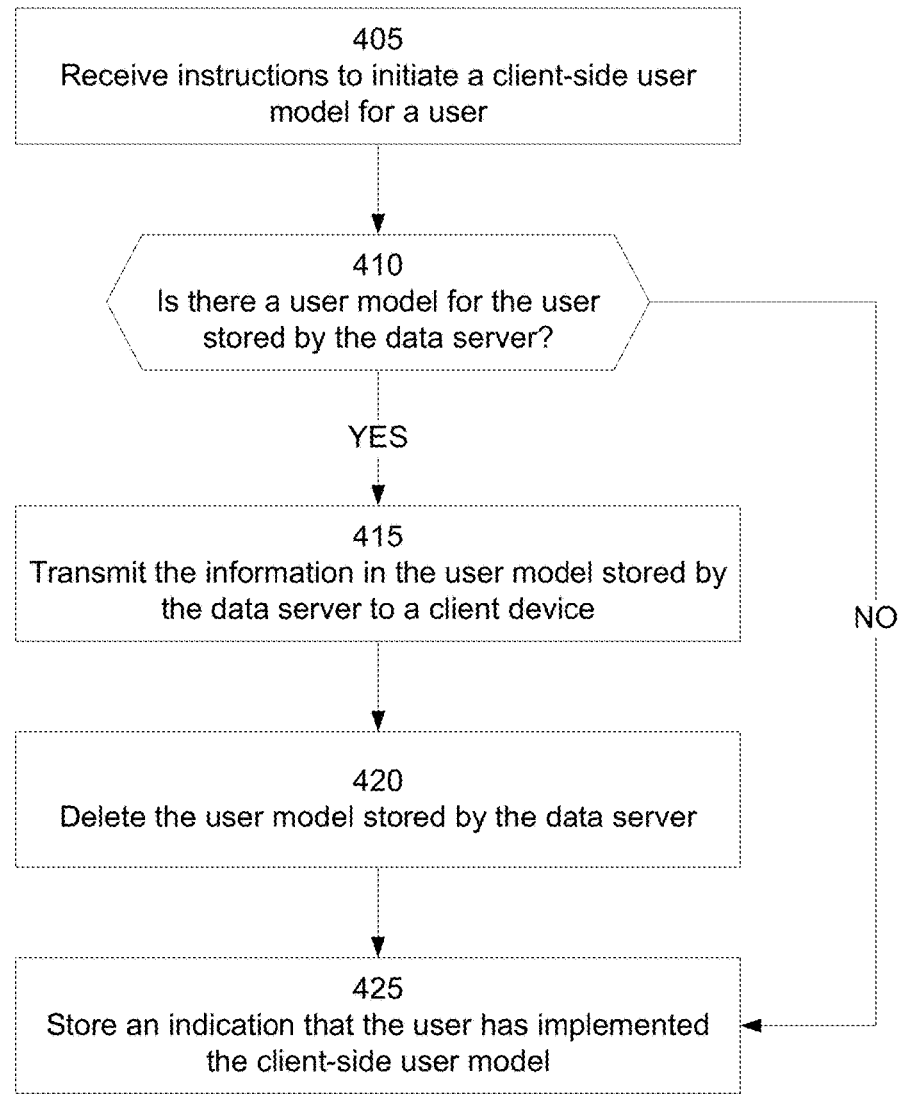
FIG. 4 is a flow chart illustrating another example process for initiating a client-side user model scheme, in accordance with various aspects of the subject technology.

FIG. 4 is a flow chart illustrating another example process 400 for initiating a client-side user model scheme, in accordance with various aspects of the subject technology. Although the operations in process 400 are shown in a particular order, certain operations may be executed in different orders or at the same time. The process 400 may be performed by, for example, the data server 120 of FIG. 1. At operation 405, the data server 120 may receive instructions to initiate a client-side user model for a user. The instructions may be received from the client device 105 that the client-side user model scheme is to be implemented on or from a third party (e.g., a service provider 130 or another system configured to initiate a client-side user model scheme).

The instructions may include a user identifier used to identify the user model associated with the user that is to be transmitted, and a device identifier used to identify the client device 105 that the user model is to be transmitted to. The device identifier may be, for example, an internet protocol (IP) address, a mobile device number (e.g., a telephone number or International Mobile Subscriber Identity (IMSI) number), a media access control (MAC) address, or any other identifier or combination of information that may be used to identify a client device. The user identifier may be, for example, a user name, a user identification number, or any other identifier or combination of user information that can be used to identify a user model associated with the user.

In some cases, the user identifier may also be a device identifier that can be used to identify the user.

At operation 410, the data server 120 may determine whether a user model associated with the user is stored by the data server 120. For example, the data server 120 may search for a user model stored in memory (e.g., a database or other memory device) that corresponds to the user identifier in the instructions. If there is no user model associated with the user stored by the data server 120, the process 400 may jump to operation 425, which will be described in further detail below.

On the other hand, if there is a user model associated with the user stored by the data server 120, the data server 120 may transmit the user information in the user model to a client device 105 at operation 415. In some cases, transmitting the information in the user model may involve transmitting the entire user model, transmitting all of the information stored in the user model, or transmitting a portion of the information stored in the user model to the client device 105.

Once the information in the user model stored by the data server 120 has been transmitted to the client device 105, the data server 120 may delete the user model stored by the data server 120 at operation 420. In some cases, the data server 120 may wait to receive a confirmation from the client device 105 or other third party indicating that the user model information has been successfully received or stored at the client device 105. After the confirmation is received, the data server 120 may delete the user model stored by the data server 120.

At operation 425, the data server 120 may store an indication that the user has implemented the client-side user model. The indication may be used to inform service providers 130 that the user model for the user has been transmitted to a client device 105. The indication may further include a device identifier that indicates where the user model is being stored. By storing the indication that the user has implemented the client-side user model, the service providers 130 may redirect subsequent requests for user information to the client device 105 storing the user model.

Figure 5:
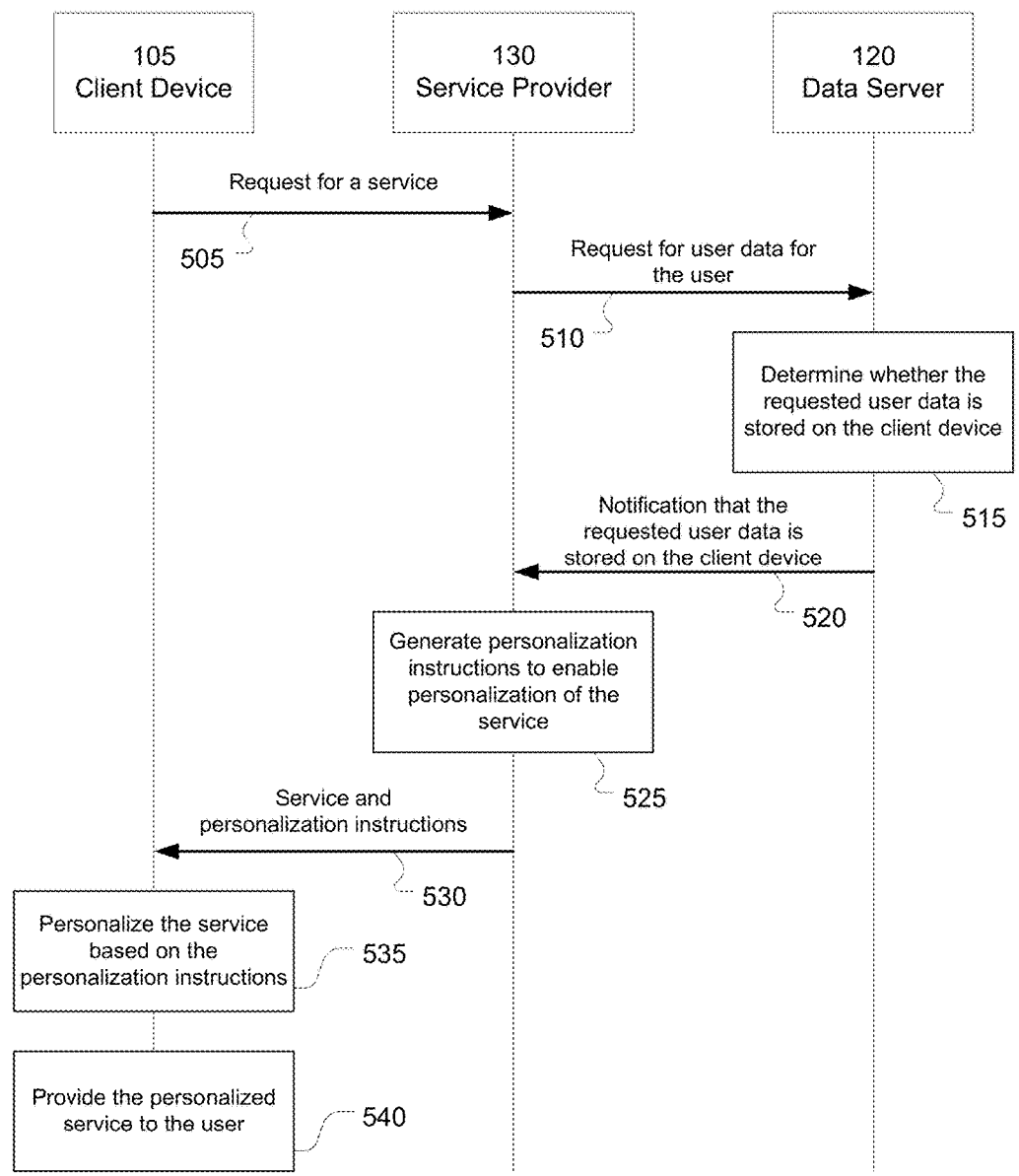
FIG. 5 is a flow chart illustrating an example process for providing personalized services using a client-side user model, in accordance with various aspects of the subject technology.

FIG. 5 is a flow chart illustrating an example process 500 for providing personalized services using a client-side user model, in accordance with various aspects of the subject technology. Although the operations in process 500 are shown in a particular order, certain operations may be executed in different orders or at the same time. At operation 505, a client device 105 may transmit a request for a service to a service provider 130. The service provider 130 may be configured to provide any number of various personalized services. For example, a service provider 130 in the form of a web server may be configured to serve one or more web pages with personalized content (e.g., a web page with personalized content or targeted advertisements) to a client device 105. In such a scenario, a browser on a client device 105 may transmit a request for a particular web page from a web server.

In response to receiving the request for the service, the service provider 130 may transmit to a data server 120 a request for user data that may be used to personalize the requested service at operation 510. The request may identify the type of information requested as well as the user (e.g., using a user identifier) that the information is about. After receiving the request for user data for the user, at operation 515, the data server 120 may determine whether the data server 120 has access to the requested user data for the identified user. If the data server 120 has access to the requested user data (e.g., a user model for the user containing the requested user data is stored on the data server 120), the user may not have initiated a client-side data model. Accordingly, the data server 120 may provide the service provider 130 with the requested user data and the service provider 130 may use the provided user data to render personalized services to the user of the client device 105.

If on the other hand, the data server 120 does not have access to the requested user data for the identified user, the data server 120 may transmit to the service provider 130 a notification that the requested data is stored on the client device at operation 520. The data server 120 may determine that the data server 120 does not have access to the requested user data for the identified user if, for example, the data server 120 is unable to find a user model for the identified user or if the data server finds an indication that the user has implemented a client-side user model (e.g., a flag, a stub, a placeholder).

At operation 525, the service provider 130 may generate personalization instructions to enable the personalization of the service and, at operation 530, provide the service as well as the personalization instructions to the client device 105. According to other aspects of the subject technology, the personalization instructions may be retrieved from a database of previously generated personalization instructions. The personalization instructions are configured to enable the client device 105 to personalize the service received from the service provider 130 based on the user data stored on the client device 105. When the client device 105 receives the service and personalization instructions, the client device may, at operation 535, personalize the received service based on the personalization instructions generated by the service provider 130 and provide the personalized service to the user at operation 540.

In one example scenario, the service provider 130 (e.g., a web server) is configured to provide one or more web pages with personalized content (e.g., a web page with personalized content or targeted advertisements) to a client device 105. In such a scenario, a user may direct a web browser on a client device 105 to request a particular web page from the server. The web server may transmit a request to the data server 120 for user data for the user that can be used to generate or select personalized content to be included in the requested web page. The data server 120 may determine that the requested user data is stored in a user model on the client device 105 and notify the web server. In response to being notified that the user data is in a user model on the client device, the web server may generate personalization instructions configured to personalize the web page requested by the client device 105 and transmit the personalization instructions along with the requested web page to the client device 105.

The personalization instructions may include information that can be used by the client device 105 to personalize the web page based on user data in the user model stored on the client device 105. The information may be in the form of an algorithm, script, or other executable code that can be executed on the client device in order to generate or select content that is to be included in the web page. For example, the client device 105 may receive the personalization instructions and the web page from the web server and use the personalization instructions in conjunction with the user model on the client device 105 to personalize the web page by generating or selecting content to add, include, or replace other content in the web page. The resulting personalized web page may then be displayed to the user in the web browser.

In some aspects, the web server may also transmit to the client device a set of possible content items that may be used to personalize the requested service. For example, based on the personalization instructions and the user information in the user model, the client device 105 may select one or more content items from the set of possible content items to include in the web page.

According to one example aspect, the set of possible content items may include a number of offers or advertisements to display to the user in the web page. In order to select which offer or advertisement to display in the web page, the client device 105 may execute the personalization instructions, which may be configured to filter the set of possible content items based on information in the client-side user model. When an offer or advertisement is found, the client device 105 may display the offer or advertisement in the web page. Accordingly, according to some aspects of the subject technology, a personalized offer or advertisement may be displayed in the web page without the web server having to ever know information about the user. Furthermore, the information may be kept on the client device 105 instead of a data server 120, which the user may prefer and which may have some information security advantages. The rendering of the web page, which includes personalized content, may also be performed more efficiently. For example, because the user information is on the client device 105, there is no need to send a request for user data to a data server or to receive the user data from the data server. Accordingly, time and other computing resources may be saved.

Figure 6:
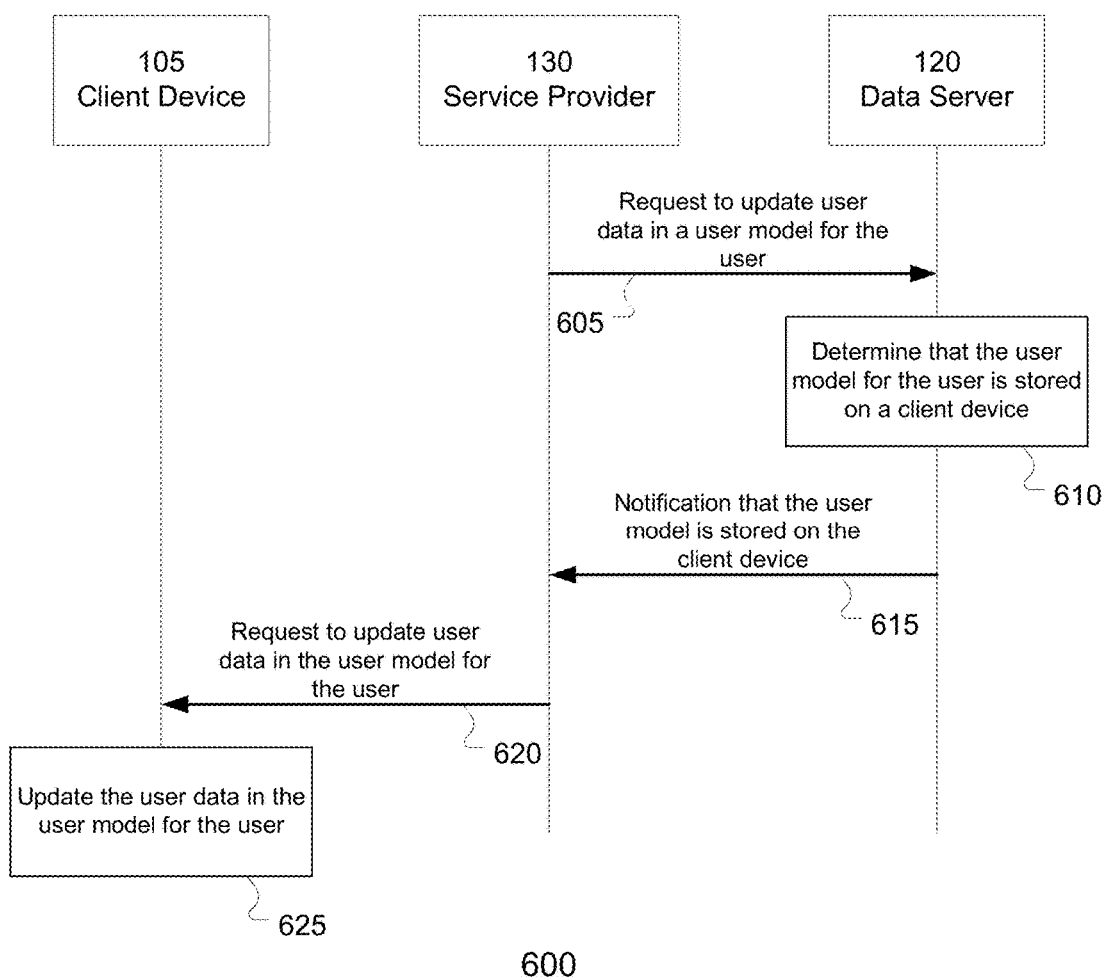
FIG. 6 is a flow chart illustrating an example process for updating user data in a client-side user model, in accordance with various aspects of the subject technology.

According to some aspects, providers of personalized services or other parties may also add new information to the user model on the client device, remove old information from the user model, or update information on the user model. FIG. 6 is a flow chart illustrating an example process for updating user data in a client-side user model, in accordance with various aspects of the subject technology. Although the operations in process 600 are shown in a particular order, certain operations may be executed in different orders or at the same time.

A service provider 130, at some point, may become aware of new user information or updated user information. The service provider may become aware of new or updated user information if, for example, during some process, new or updated user information has been generated or user information previously unknown to the service provider 130 is received from another source. At operation 605, the service provider may transmit to the data server 120 a request to update user data in a user model associated with the user. At operation 610, the data server 120 may determine that the user model for the user is stored on a particular client device 105 and redirect the service provider 130 to that client device 105 by, for example, transmitting to the service provider 130 a notification that the user model is stored on the client device at operation 615.

In response to receiving the notification, at operation 620, the service provider 130 may transmit the request to update user data in the user model to the client device 105. The request to update user data in the user model may include a field in the user model to update and data to update the field with or add to the information already in the field. The request may also, or alternatively, include a new field to add to the user model and data to update the field with. Upon receiving the request and performing any authorization processes that are called for, the client device 105 may update the user data in the user model for the user at operation 625.

Referring back to the user model 200 of FIG. 2, a user model 200 may include a data structure or other unit of data configured to store information about a user that can be used to provide personalized services for the user. As discussed above, users may feel more comfortable with storing user information in a user model on the client device rather than on a data server. Furthermore, because the user model is stored on the client device, the user may be more comfortable with the user model containing more information about the user, including possibly sensitive user information. Storing the user model on the client device also protects user information from being compromised by malicious parties targeting the data server.

However, in some cases, there may be a limit to how much information or what kind of information the user feels comfortable keeping even on a client-side user model. For example, the user may not wish to have services personalized based on sensitive information (e.g., a social security number) or keep the sensitive information in the client-side user model in case the client device 105 gets compromised. In addition, although the user model may be stored on the client device, in many cases, the data server, providers of services, or other authorized third parties may modify the user model by adding user information, removing user information, or changing user information in the user model. However, these modifications may not be accurate or may add or remove user information that the use would not like to be included in the user model. Furthermore, the user has little control and knowledge over what is included in the user model.

Accordingly, various aspects of the subject technology also provide means for a user to have greater control over the user model. For example, a system operating on the client device may provide a user interface that enables the user to view the user model, propose changes to the user model, experience how the proposed changes may alter the personalized services provided based on the user model, and modify the user model.

FIG. 7 is an illustration of an example user interface that provides a user with control over a user model stored on a client device, in accordance with various aspects of the subject technology. The user interface in FIG. 7 may be implemented as a user model manager 700 configured to provide. According to one aspect, the user model manager 700 may be configured to provide users with web pages containing personalized content (e.g., articles, advertisements, links, etc.). However, in other aspects, other user interfaces for other personalized services may also be used.

The user model manager 700 in FIG. 7 includes an interface component 705 that allows the user to view the content of the user model (e.g., the user information stored in the user model) and propose changes to the content of the user model. The user model manager 700 also includes an interface component 710 that enables the user to select an example interface (e.g., a particular web page) in order to view how the changes proposed in interface component 705 may be reflected in the example interface. For example, a user may select a particular web page as the example interface and, in response to the selection, the selected web page may be displayed in interface component 715 based on the version of the user model shown in interface component 705. If the user proposes changes to portions of the user model in interface component 705, the web page displayed in interface component 715 may be updated to reflect the proposed changes in the user model. The user is also able to confirm the proposed changes by selecting interface element 720 and the proposed changes may be saved to the user model stored on the client device.

The web pages that are displayed and able to be selected in interface component 710 may be web pages that are frequently visited by the user, web pages that have been bookmarked by the user, or web pages selected by an administrator. In some cases, the user may also be able to input a web page to view. In other aspects, the web pages that are able to be selected in interface component 710 may be web pages that are able to illustrate the effects of proposed changes to the user model.

The user model manager 700 may receive, via interface component 710, a user selection of a web page that the user would like to be displayed in interface component 715 based on the user model in interface component 705. After receiving the user selection, the user model manager 700 may contact a web server corresponding to the selected web page to retrieve, from the web server via a network, the selected web page and personalization instructions for the selected web page.

In other aspects, however, the selected web page and personalization instructions for the selected web page may have been stored on the client device the last time the web page was displayed in a web browser or other interface. Accordingly, the selected web page and personalization instructions for the selected web page may be retrieved from memory instead of having to retrieve the information from the web server.

The personalization instructions may include information that can be used by the user model manager 700 to personalize the web page based on user data in the user model. The information may be in the form of an algorithm, script, or other executable code that can be executed by the user model manager 700 in order to generate or select content that is to be included in the web page. Based on the personalization instructions for the selected content being applied to the version of the user model shown in interface component 705, the user model manager 700 can display the selected web page in interface component 715.

The user can also make modifications to the user model by changing elements of the user model in interface component 705. For example, the user may add elements (e.g., adding "basketball" to the interests), remove elements (e.g., removing an interest in the user model), or change elements (e.g., correct the user's age, address, or preferences). The user model manager 700 may receive the user modifications of the user model and display an updated web page based on the personalization instructions for the selected content being applied to the modified user model in interface component 705.

Figure 8:
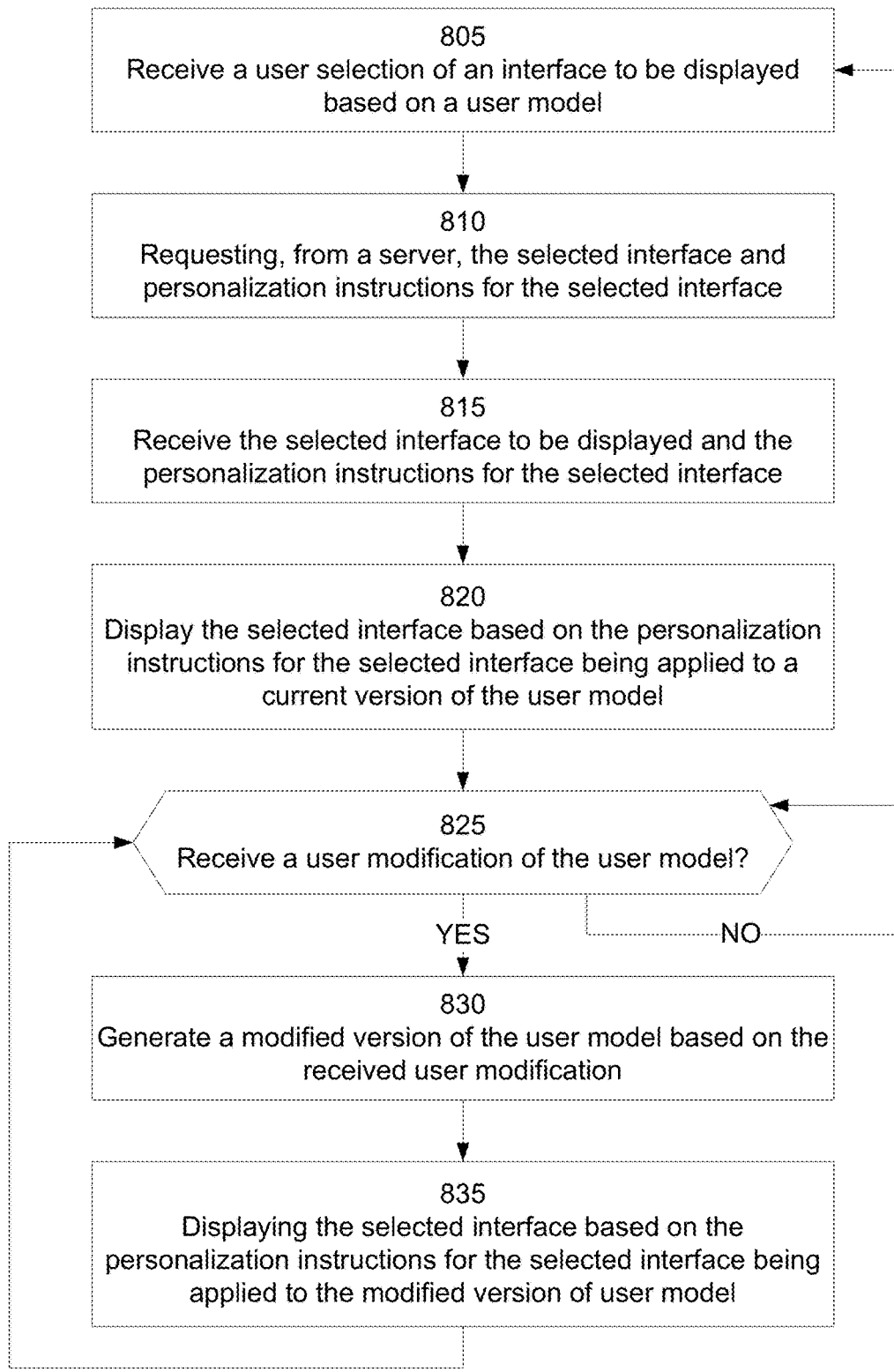
FIG. 8 is a flow chart illustrating an example process for displaying an example interface based on a user modification to a user model, in accordance with various aspects of the subject technology.

FIG. 8 is a flow chart illustrating an example process 800 for displaying an example interface based on a user modification to a user model, in accordance with various aspects of the subject technology. Although the operations in process 800 are shown in a particular order, certain operations may be executed in different orders or at the same time. Furthermore, although the process 800 is described as being performed by a client device 105, other entities, such as, for example, the data server 120, may also perform the process.

At operation 805, the client device 105 may receive a user selection of an interface (e.g., an example web page) to be displayed based on a user model. The selection may be made in another user interface such as the user model manager 700 of FIG. 7, and in particular, interface component 710 of the user model manager 700. According to some implementations, the client device 105 may not initially have access to the selected interface. Accordingly, at operation 810, the client device 105 may request, from a server (e.g., a web server or other service provider 130), the selected interface and personalization instructions for the selected interface and at operation 815, the client device 105 may receive the selected interface and the personalization instructions from the server. In other implementations, however, the selected interface and personalization instructions may be stored in memory by the client device 105 or locally accessible to the client device 105. Accordingly, the selected interface and the personalization instructions may be retrieved without involving the server.

As described above, the personalization instructions are configured to enable the client device 105 to personalize a service received from a service provider 130 based on a user data. For example, the client device 105 may be able to personalize a selected interface (e.g., an example web page) based on the personalization instructions and the current version of the user model. In some aspects, the client device 105 may also receive from the server a set of possible content items (e.g., articles, images, links, advertisements, offers, etc.) that the client device 105 may use to personalize the requested selected interface.

At operation 820, the client device 105 may display the selected interface in interface component 715 of the user model manager 700 based on the personalization instructions for the selected interface being applied to a current version of the user model (as may be viewed in interface component 105). At operation 825, the client device 105 may determine whether a modification of the user model has been received from the user. For example, the client device 105 may detect user changes to the user model displayed in interface component 705 of the user model manager 700. Changes may include adding or removing information in the user model, adding or removing fields in the user model, rearranging the user model, changing fields or information in the user model, or otherwise altering fields or information in the user model.

If no user modification has been received, the client device 105 may wait until a modification is received at operation 825 or until the user selects another interface to be displayed based on the user model at operation 805. If a user modification is received, at operation 830, the client device 105 may generate a modified version of the user model based on the received user modification and, at operation 835, display the selected interface based on the personalization instructions for the selected interface being applied to the modified version of the user model.

After the selected interface is displayed based on the modified user model, the client device may return to operation 825 to await any further user modifications to the user model. If the user further modifies the user model in interface component 705 of the user model manager 700, the client device 105 may receive the modification at operation 825 and perform operations necessary to display the selected interface that reflect the further changes to the user model. As described above, when the user is satisfied with the changes to the information in the user model, the user may confirm the changes by selecting interface element 720 and instruct the client device 105 to save the changes to the user model. In response to receiving the instructions to save the changes to the user model, the client device may save the modified user model to memory.

By providing a user model manager 700 or other means for viewing and altering the information in a user model, a user is allowed greater control over the user model and may, as a result, feel more comfortable with storing user information in the user model and having services personalized based on the user model. Furthermore, by allowing the user to see how changes in a user model are reflected in changes in the personalized services provided based on the user model, a user is able to be more informed in making changes to information in the user model.

Figure 9:
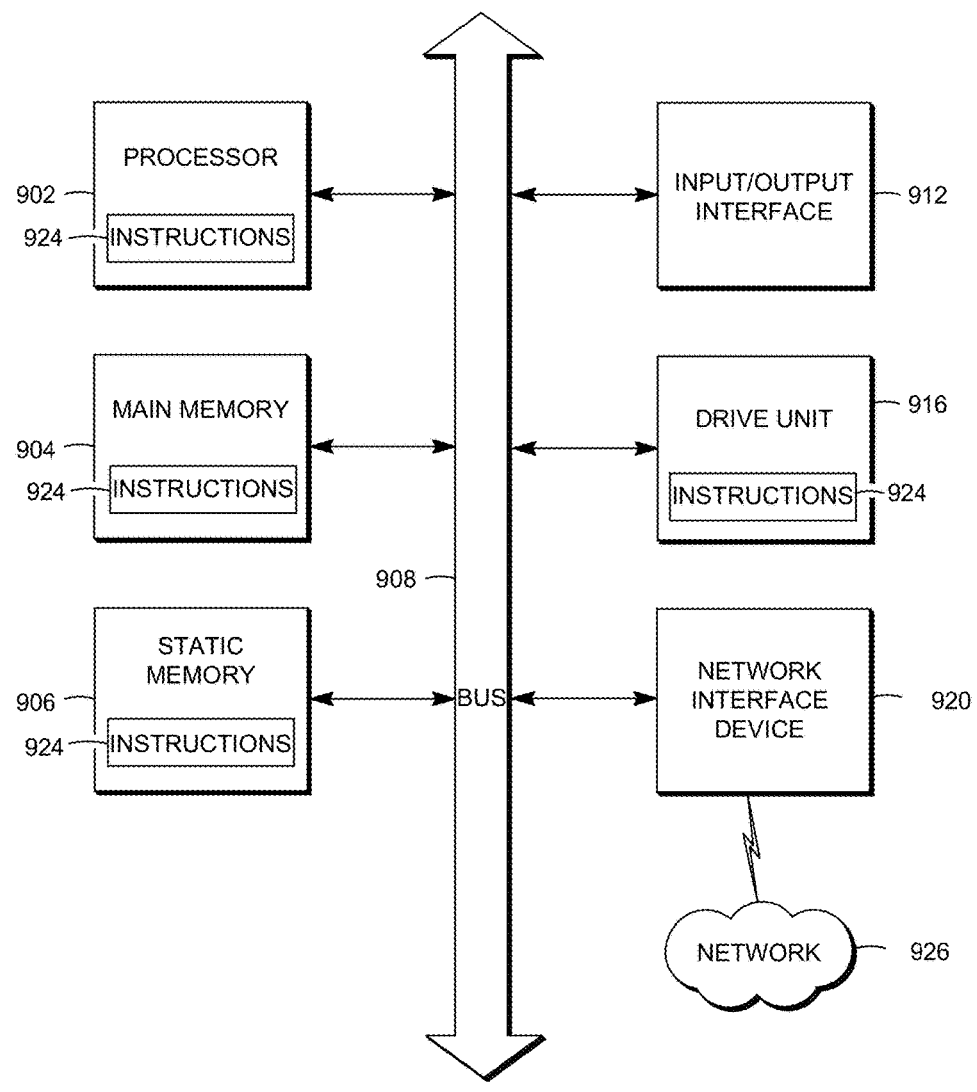
FIG. 9 is a block diagram illustrating an example computer system with which any of the devices, servers, or systems discussed herein may be implemented, in accordance with various aspects of the subject technology.

FIG. 9 is a block diagram illustrating an example computer system 900 with which any of the devices, servers, or systems discussed herein may be implemented, in accordance with various aspects of the subject technology. In certain aspects, the computer system 900 may be implemented using hardware or a combination of software and hardware, either in a dedicated server, or integrated into another entity, or distributed across multiple entities.

The example computer system 900 includes a processor 902, a main memory 904, a static memory 906, a disk drive unit 916, and a network interface device 920 which communicate with each other via a bus 908. The computer system 900 may further include an input/output interface 912 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 902 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 924 embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may further be transmitted or received over a network 926 via the network interface device 920.

The machine-readable medium may be a single medium or multiple media (e.g., a centralized or distributed database, and/or associated caches and servers) that store the one or more sets of instructions. The machine-readable medium may include the drive unit 916, the static memory 906, the main memory 904, the processor 902, an external memory connected to the input/output interface 912, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps or blocks in the processes disclosed is an illustration of example approaches. Based upon design preferences, it is understood that the specific order or hierarchy of steps or blocks in the processes may be rearranged. Some of the steps or blocks may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method comprising:
   receiving instructions to initiate a client-side user model for a user, wherein the instructions include a device identifier and a user identifier;
   determining, based on the user identifier, that a user model for the user is stored on a data server, the user model comprising information about the user;
   facilitating transfer of the user model from the data server to a client device corresponding to the device identifier for storage on the client device;
   deleting the user model on the data server in response to the user model being transferred to the client device;
   receiving, by the data server from a service provider server, a request for user data in the user model;
   determining, in response to the request, by the data server, that the user data in the user model has been transferred from the data server to the client device; and
   providing for transmission, by the data server, a notification to the service provider server, the notification indicating that the user data is stored on the client device.

2. The computer-implemented method of claim 1, further comprising storing, on the data server, an indication with information that the user model for the user has been transferred to the client device corresponding to the device identifier.

3. The computer-implemented method of claim 1, wherein the requested user data is to be used to personalize a service for the user.

4. The computer-implemented method of claim 2, wherein the indication comprises a placeholder value identifying a null or empty user model.

5. The computer-implemented method of claim 2, wherein the indication comprises the device identifier.

6. The computer-implemented method of claim 1, wherein the instructions to initiate the client-side user model for the user are received from the client device.

7. The computer-implemented method of claim 1, wherein the instructions to initiate the client-side user model for the user are received from the service provider server.

8. The computer-implemented method of claim 1, further comprising receiving, prior to the deleting of the user model on the data server, a communication confirming that the user model has been stored on the client device.

9. The computer-implemented method of claim 1, wherein the device identifier comprises at least one of an internet protocol (IP) address, a telephone number, an International Mobile Subscriber Identity (IMSI) number, or a media access control (MAC) address.

10. The computer-implemented method of claim 1, wherein the user identifier comprises at least one of a user name, a user identification number, or a device identifier.

11. A system comprising:
one or more processors; and
a machine-readable medium comprising instructions stored therein, which when executed by the one or more processors, cause the one or more processors to perform operations comprising:
receiving instructions to initiate a client-side user model for a user, wherein the instructions include a device identifier and a user identifier;
identifying, based on the user identifier, a user model for the user at a data server, wherein the user model comprises information about the user;
transmitting the information about the user in the user model to a client device corresponding to the device identifier for transfer to the client device;
deleting the user model in response to the user model being transmitted for transfer to the client device; and
receiving, by the data server from a service provider server, a request for user data in the user model;
determining, in response to the request, by the data server, that the user data in the user model has been transferred from the data server to the client device; and
providing for transmission, by the data server, a notification to the service provider server, the notification indicating that the user data is stored on the client device.

12. The system of claim 11, wherein the operations further comprise:
storing, on the data server, an indication with information that the user model for the user has been transmitted to the client device corresponding to the device identifier.

13. The system of claim 11, wherein the data server is configured to store a plurality of user models for a plurality of users.

14. A non-transitory machine-readable medium comprising instructions stored therein, which when executed by a machine, cause the machine to perform operations comprising:
receiving instructions to initiate a client-side user model for a user, wherein the instructions include a device identifier and a user identifier;
identifying, based on the user identifier, a user model for the user, wherein the user model is stored on a data server and comprises information about the user;
transmitting the information about the user in the user model on the data server to a client device corresponding to the device identifier for transfer to the client device;
deleting the user model on the data server in response to the user model being transmitted for transfer to the client device;
storing, on the data server, an indication that the user model for the user has been transmitted to the client device corresponding to the device identifier;
receiving, by the data server from a service provider server, a request for user data in the user model;
determining, in response to the request, by the data server, that the user data is stored on the client device based on the stored indication; and
providing for transmission, by the data server, a notification to the service provider server, the notification indicating that the user data is stored on the client device.

15. The non-transitory machine-readable medium of claim 14, wherein the requested user data is to be used to personalize a service for the user.

16. The non-transitory machine-readable medium of claim 14, wherein the indication comprises a placeholder value and the device identifier, the placeholder value identifying a null or empty user model.

17. The non-transitory machine-readable medium of claim 14, wherein the instructions to initiate the client-side user model for the user are received from the client device.

18. The non-transitory machine-readable medium of claim 14, wherein the operations further comprise receiving, prior to the deleting of the user model on the data server, a communication confirming that the user model has been stored on the client device.

19. The system of claim 11, wherein the instructions to initiate the client-side user model for the user are received from the client device.

* * * * *